Patented Apr. 20, 1943

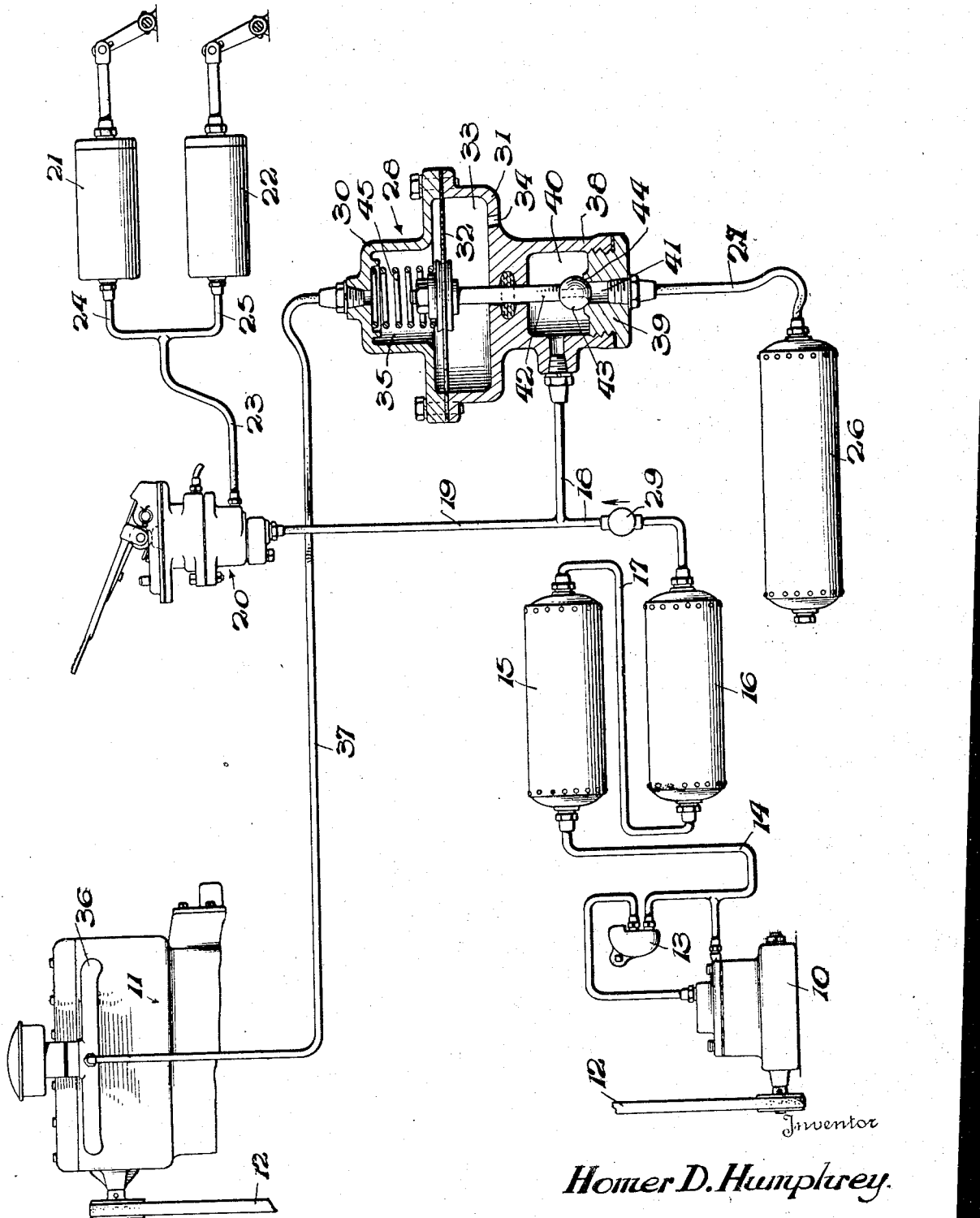

2,317,194

UNITED STATES PATENT OFFICE 2,317,194

BRAKE MECHANISM

Homer D. Humphrey, Pittsburgh, Pa., assignor to Bendix-Westinghouse Automotive Air Brake Company, Pittsburgh, Pa., a corporation of Delaware Application March 24, 1941, Serial No. 384,970

20 Claims. (Cl. 303—84)

This invention relates to fluid pressure apparatus and more particularly to a fluid pressure receiving system adapted for use in connection with fluid pressure braking systems for automotive vehicles.

In conventional fluid pressure braking systems for automotive vehicles, a fluid compressor is driven by the vehicle engine for supplying fluid pressure to a reservoir, from which the fluid pressure may be utilized for applying the vehicle brakes and also for operating auxiliary equipment associated with the vehicle. In systems of this type, when the engine is rendered inoperative, and thereafter, when the source of fluid pressure is utilized in a manner outlined above, or in the event of leakage in the system, the pressure of the fluid in the reservoir will fall below a value sufficient to maintain an application of the vehicle brakes. Therefore, to safely operate a vehicle utilizing such a system, it is necessary to run the engine to drive the compressor, while the vehicle is at rest, until the fluid in the system builds up to a pressure of sufficient value to give an effective brake application, before the vehicle can be safely driven.

Therefore, one of the objects of the present invention is to provide a fluid pressure receiving system so arranged as to overcome the disadvantages enumerated heretofore.

Another object of the invention is to provide a fluid pressure receiving system having a novel arrangement for isolating a source of fluid pressure from the system when the engine, which operates a mechanism for supplying fluid pressure to the system, is rendered inoperative.

Still another object is to provide a fluid pressure receiving system of the above character wherein the construction is such as to allow the isolated source of fluid pressure to be utilized when the engine is rendered operative.

A further object of the invention is to provide, in a fluid pressure receiving system, an arrangement for isolating a source of fluid pressure from the system when the engine, which operates a mechanism for supplying fluid pressure to the system, is rendered inoperative, and for allowing the isolated source of fluid pressure to be utilized when the engine is rendered operative, and for preventing the flow of fluid pressure therefrom to other parts of the system when the pressure of the fluid in the other parts is below the pressure of the isolated fluid.

A still further object is to provide a novel arrangement of parts so constructed and arranged as to be capable of ready inspection and repair and of such a nature that the same may be manufactured and installed upon existing fluid pressure systems at a relatively low cost.

Other objects and features of novelty of the invention will appear more clearly from the accompanying drawing, which illustrates one embodiment of the invention. It is to be expressly understood, however, that the drawing is for purposes of illustration only and is not designed as a definition of the limits of the invention, reference being had for this purpose to the appended claims.

Referring more particularly to the drawing, a fluid pressure brake system embodying the present invention is disclosed therein as having a fluid compressor 10, driven by an engine 11 by means of a belt 12, and controlled by a pressure governor 13, for supplying fluid under pressure, through conduit 14 to reservoirs 15 and 16, the latter being connected in series relation by means of a conduit 17. Conduits 18 and 19 are provided for supplying fluid pressure from the reservoir 16 to a brake valve 20, preferably of the self-lapping type, as disclosed in the patent to W. J. Andres and R. S. Sanford, No. 2,133,275, dated October 18, 1938, for Control mechanism, which is adapted to control the flow of fluid pressure to a plurality of brake actuators 21 and 22, through conduits 23, 24 and 25.

As heretofore stated, it is one of the objects of the present invention to provide means for isolating a source of fluid pressure from the conventional braking system when the engine which drives the compressor for supplying a source of fluid pressure to the system is rendered inoperative, and for allowing the source of isolated fluid pressure to flow to the system when the engine is rendered operative. Such means, as disclosed in the drawing, comprises a reservoir 26 which is supplied with fluid pressure through conduits 18 and 27. A valvular device 28, which will be more fully described hereinafter, is adapted to control the flow of fluid pressure from the conduit 18 to the conduit 27 in response to the operation or the lack of operation of the engine 11. A one-way check valve 29 is positioned in conduit 18 for permitting the flow of fluid pressure from the reservoir 16 to the brake valve 20 while preventing flow in the reverse direction.

More particularly, the valvular mechanism 28 comprises upper and lower body portions 30 and 31 confining a pressure responsive element, such as a diaphragm 32, therebetween, thus defining a chamber 33, which communicates with the atmosphere through a port 34 in the body portion 31, and a chamber 35 which is connected to an intake manifold 36 of the engine 11 through conduit 37. The body portion 31 includes a downwardly extending cylindrical portion 38 adapted to cooperate with a threaded plug 39 to define a chamber 40, which at all times communicates with conduit 18. The plug 39 includes a port 41 for providing a fluid connection between the chamber 40 and the conduit 27. This fluid connection is normally closed by the action of a valve member 42, which is mounted for reciprocatory motion in the body portion 31. One end of the valve member 42 is secured to the diaphragm 32 by any suitable means, and the other end thereof has secured thereto a ball valve 43 which is adapted to cooperate with a valve seat 44 of the plug 39. The ball valve 43 is normally held against the valve seat 44 by the action of a spring 45 to normally close the fluid connection between conduits 18 and 27.

In the normal position of the valvular mechanism 28, when there is no vacuum present in the chamber 35 due to the lack of operation of the engine 11, the spring 45 urges the diaphragm 32 and the member 42 downwardly, to bring the ball valve 43 into contact with the valve seat 44 and thus close the fluid connection between conduits 18 and 27. When the engine 11 operates, vacuum will be present in the intake manifold 36 and also in the chamber 35 of the valvular mechanism 28, due to the connection provided therebetween by the conduit 37. The presence of vacuum in the chamber 35 will cause the diaphragm 32 and the valve member 42 to move upwardly as viewed in the drawing, against the resistance of the spring 45, and thus move the ball valve 43 away from the seat 44 and allow the flow of fluid pressure from conduit 27, through the chamber 40 to conduit 18.

In the operation of the fluid pressure system heretofore described, when the engine 11 is operating, the compressor 10 will supply fluid pressure to the reservoirs 15 and 16, through conduits 14 and 17, and hence to the brake valve 20 through conduit 19. The brake actuators 21 and 22 may therefore be energized with fluid pressure by operation of the brake valve in a manner fully understood by those skilled in the art. Vacuum will be present in the chamber 35 of the valvular mechanism 28, and a fluid connection between conduits 18 and 27 will, therefore, be established to allow the flow of fluid pressure from the reservoir 16 to the reservoir 26 through conduit 18, chamber 39 of the valvular mechanism 28, and conduit 27. It will be readily understood that the pressure of the fluid in the reservoir 26 will be substantially equal to the pressure of the fluid in the reservoirs 15 and 16, and that the supply of fluid pressure to all the reservoirs will be controlled by the pressure governor 13.

When the engine 11 is rendered inoperative there will be no vacuum present in the intake manifold 36, nor in the chamber 35 of the valvular mechanism 28, and therefore, the spring 45 will move the ball valve 43 into contact with the valve seat 44 to close the fluid connection between conduits 18 and 27. Due to this action of the valvular mechanism 28 the fluid pressure in the reservoir 26 will be isolated from the system. If a brake application is made when the engine 11 is inoperative, the fluid pressure required therefor will be supplied from the reservoirs 15 and 16, and thus reduce the pressure of the fluid contained in these reservoirs. It can be readily seen that the fluid pressure in the reservoirs 15 and 16 may be utilized to such an extent, when the engine 11 is inoperative, that the pressure of the fluid therein may be reduced to a low value that would be insufficient to maintain an application of the vehicle brakes. However, when the engine 11 is rendered operative, the valvular mechanism 28 is operated by the presence of vacuum in the intake manifold 36, to allow the flow of fluid pressure from the reservoir 26 to the brake valve 20, and a source of fluid under a relatively high pressure is thus immediately made available for applying the vehicle brakes. The check valve 29 prevents flow of fluid from the reservoir 26 to reservoir 16 under these conditions. When the compressor 10 has operated a sufficient length of time to increase the pressure of the fluid in the reservoirs 15 and 16 to a value greater than the pressure of the fluid in the reservoir 26, the check valve 29 will operate and allow the fluid pressure from the reservoirs 15 and 16 to supply the brake valve 20 in the conventional manner.

Thus, the present invention provides a fluid pressure receiving system wherein a source of fluid pressure is isolated from the system when the engine, which operates a mechanism for supplying fluid pressure to the system, is rendered inoperative, and also provides means for allowing the source of isolated fluid pressure to flow to certain portions of the system where the same may be utilized when the engine is rendered operative.

When such an arrangement is employed in a fluid pressure braking system for automotive vehicles, it will be readily understood by those skilled in the art that numerous advantages result therefrom. For example, if a brake application is made after the engine is rendered inoperative, or, if the source of fluid pressure not isolated from the system is utilized to operate auxiliary equipment, the pressure of such fluid may be so reduced as to be of insufficient value to give an effective brake application. However, in the present system, a source of fluid pressure is available to give a maximum brake application the instant the engine is rendered operative, and, therefore, it is unnecessary for the vehicle to remain at rest while the compressor operates to build up the pressure of the fluid in the system to a safe value.

Although only one embodiment of the invention has been illustrated and described heretofore, it will be readily understood by those skilled in the art that various other arrangements and modifications may be resorted to without departing from the spirit of the invention. Reference will, therefore, be had to the appended claims for a definition of the limits of the invention.

What is claimed is:

1. A fluid pressure system comprising an engine, a fluid compressor driven by said engine, a plurality of reservoirs for receiving fluid pressure from said compressor, and means for preventing the flow of fluid pressure from one of said reservoirs when the engine is rendered inoperative.

2. A fluid pressure system comprising an engine, a fluid compressor driven by said engine, a reservoir for receiving fluid pressure from said compressor, a second reservoir for receiving fluid pressure from the first named reservoir, and means for preventing the flow of fluid pressure from said second reservoir when the engine is rendered inoperative.

3. In a fluid pressure system comprising an engine, a fluid compressor driven by said engine, a plurality of reservoirs for receiving fluid pressure from said compressor, means for preventing the flow of fluid pressure from one of said reservoirs when the engine is rendered inoperative, and means responsive to the operation of the engine for actuating said first named means for allowing the flow of fluid pressure from said one reservoir.

4. In a fluid pressure system comprising an engine, a fluid compressor driven by said engine, and a reservoir for receiving fluid pressure from said compressor, a second reservoir for receiving fluid pressure from the first named reservoir, and means for preventing the flow of fluid pressure from said second reservoir when the engine is rendered inoperative, said means including means responsive to the operation of the engine for allowing the flow of fluid pressure from said second reservoir.

5. In combination with a fluid pressure system having an engine, a fluid compressor driven by said engine, and a plurality of reservoirs for receiving fluid pressure from said compressor, means for normally preventing the flow of fluid pressure from some of said reservoirs, and means associated with said means for allowing the flow of fluid pressure from said last named reservoirs when the engine is operating.

6. In combination with a fluid pressure system having an engine, a fluid compressor driven by said engine, and a reservoir for receiving fluid pressure from said compressor, a second reservoir, a fluid connection between the first named reservoir and said second reservoir, means in said connection for preventing the flow of fluid pressure from said second reservoir to said first reservoir, means for normally preventing the flow of fluid pressure from said second reservoir, and means responsive to the operation of the engine for allowing the flow of fluid pressure from said second reservoir.

7. In combination with a fluid pressure system having an engine, a fluid compressor driven by said engine, a reservoir for receiving fluid pressure from said compressor, and a discharge conduit connected to said reservoir, an auxiliary reservoir, a fluid connection between said conduit and last named reservoir, means associated therewith for normally closing said connection, and means responsive to the operation of the engine for actuating said first named means for opening said connection.

8. In combination with a fluid pressure system having an engine, a fluid compressor driven by said engine, a plurality of reservoirs for receiving fluid pressure from said compressor, and a discharge conduit connected to one of said reservoirs, an auxiliary reservoir, a fluid connection between said conduit and said auxiliary reservoir, means for normally closing said fluid connection, means responsive to the operation of the engine for actuating said first named means for opening said connection, and means for preventing the flow of fluid pressure from said auxiliary reservoir to said first named reservoirs whereby when the engine is operating the discharge conduit is supplied with fluid pressure from said auxiliary reservoir when the pressure therein is greater than the pressure of the fluid in said first named reservoirs.

9. In a fluid pressure system having an engine, a fluid compressor driven by said engine, and a plurality of reservoirs connected in series relation, a conduit connecting the compressor to one reservoir of said series, a discharge conduit connected to another reservoir of said series, an auxiliary reservoir, a second conduit forming a fluid connection between said auxiliary reservoir and said discharge conduit, means in said second conduit for normally closing said fluid connection, means responsive to the operation of the engine for actuating said first named means for opening said fluid connection, and means for preventing the flow of fluid pressure from said discharge conduit to said first named reservoirs when the pressure of the fluid in the former is greater than the pressure of the fluid in the latter.

10. In a fluid pressure system having an engine, a fluid compressor driven by said engine, a plurality of reservoirs having a connection therewith for receiving fluid pressure from said compressor, an auxiliary reservoir having a connection with one of said first named reservoirs for receiving fluid pressure from said reservoirs when the engine is operating, and means for preventing the flow of fluid pressure from said auxiliary reservoir when the engine is rendered inoperative.

11. In a fluid pressure system having an engine, a fluid compressor driven by said engine, a reservoir for receiving fluid pressure from said compressor, a discharge conduit connected to said reservoir, a second reservoir connected to said discharge conduit, means for preventing fluid communication between said conduit and said second reservoir when the engine is rendered inoperative, and means responsive to operation of the engine for actuating said first named means for establishing communication therebetween.

12. In a fluid pressure system having an engine, a fluid compressor driven by said engine, a plurality of reservoirs for receiving fluid pressure from said compressor, a discharge conduit connected to said reservoirs, means for preventing the flow of fluid pressure from one of said reservoirs to said discharge conduit when the engine is rendered inoperative, means for actuating said first named means for allowing the flow of fluid pressure from said one reservoir to said discharge conduit when the engine is rendered operative, and means for preventing the flow of fluid pressure from said other reservoirs to said discharge conduit when the pressure of the fluid in the discharge conduit is greater than the pressure of the fluid in said other reservoirs.

13. In a fluid pressure braking system having a pressure responsive brake actuator and a brake valve for controlling the flow of fluid pressure to said actuator, an engine, a fluid compressor driven by said engine, a plurality of reservoirs for receiving fluid pressure from said compressor, a conduit for supplying fluid pressure from said reservoirs to said valve, an auxiliary reservoir connected to said conduit for receiving fluid pressure from said first named reservoirs, means for preventing the flow of fluid pressure from said auxiliary reservoir when the engine is rendered inoperative, means responsive to operation of the engine for actuating said means for allowing the flow of fluid pressure to and from said auxiliary reservoir to said conduit when the engine is operating, and for preventing the flow of fluid pressure from said auxiliary reservoir to said first named reservoirs.

14. In a fluid pressure braking system having a pressure responsive brake actuator and a brake valve for controlling the flow of fluid pressure to said actuator, an engine, a fluid compressor driven by said engine, a reservoir for receiving fluid pressure from said compressor, means for supplying fluid pressure from said reservoir to said valve, a second reservoir in communication with said valve and adapted to receive fluid pressure from said first named reservoir, means for preventing the flow of fluid pressure from said second reservoir to said valve when the engine is rendered inoperative, means responsive to operation of the engine for actuating said second named means for allowing the flow of fluid pressure from said second reservoir to said valve, and means for preventing the flow of fluid pressure from said second reservoir to said first reservoir when the pressure of the fluid in said first reservoir is less than the pressure of the fluid in said second reservoir.

15. In a fluid pressure system having an engine, a fluid compressor driven by said engine, a plurality of reservoirs, a plurality of conduits connecting said reservoirs in series relation for receiving fluid pressure from said compressor, a discharge conduit connected to said series, means for allowing the flow of fluid pressure to all of said reservoirs when the engine is operating, means for preventing the flow of fluid pressure to one of said reservoirs when the engine is rendered inoperative, whereby said discharge conduit is supplied with fluid pressure from other of said reservoirs, and means for actuating said second named means for preventing the flow of fluid pressure to said other reservoirs from said one reservoir when the engine is operating and when the pressure of the fluid in said one reservoir is greater than the pressure of the fluid in said other reservoirs, whereby said discharge conduit is supplied with fluid pressure from said one reservoir.

16. In combination with a fluid pressure system having a pair of reservoirs and power means including a compressor for supplying fluid pressure to said reservoirs, means for serially connecting said reservoirs, means for preventing the flow of fluid pressure between said reservoirs in one direction, and means having a connection with and controlled by the operation of the power means for preventing the flow of fluid pressure from the other reservoir in said series when the power means is inoperative.

17. The combination with a fluid pressure system having a main reservoir, an auxiliary reservoir, power means including a compressor for supplying fluid pressure to said main reservoir and a device for receiving fluid pressure from said reservoirs, of means for connecting said main reservoir with the device, means for connecting said auxiliary reservoir with the device, means for preventing the flow of fluid pressure from said auxiliary reservoir to said main reservoir at all times, and means associated with the connection between said auxiliary reservoir and the device and having a connection with and being controlled by the operation of the power means for preventing communication between the auxiliary reservoir and the device when the power means is not operating.

18. The combination with a fluid pressure system having a pair of reservoirs, power means including a compressor for supplying fluid pressure to said reservoirs and a device to be operated by fluid pressure therefrom, of means for serially connecting said reservoirs with said power means, means for connecting said reservoirs in parallel with said device, and means controlled by the operation of said power means and having a connection therewith for rendering one of said parallel connections ineffective except when the power means is supplying fluid pressure to the reservoirs.

19. The combination with a fluid pressure system having a pair of reservoirs, power means including a compressor for supplying fluid pressure to said reservoirs, and a device operable by fluid pressure from said reservoirs, of means for effecting a connection between one of said reservoirs and the device at all times, and means controlled by the operation of said power means and having a connection therewith for supplying fluid pressure to the device from the other reservoir only when the power means is operative to supply fluid pressure to said one reservoir.

20. The combination with power actuated means including a compressor for supplying fluid pressure, a pair of reservoirs for receiving fluid pressure therefrom and a device to be actuated by fluid pressure from said reservoirs, of means for serially connecting said reservoirs for receiving fluid pressure from said first named means and for connecting said reservoirs in parallel with said device, means for preventing the flow of fluid pressure between said reservoirs in one direction, and means controlled by the operation of said first named means and having a connection therewith for preventing the flow of fluid pressure from one of said reservoirs to said device when the first named means is inoperative to supply fluid pressure to said reservoirs.

HOMER D. HUMPHREY.